United States Patent [19]

Ong et al.

[11] Patent Number: 5,513,372

[45] Date of Patent: Apr. 30, 1996

[54] PERIPHERAL INTERFACE HAVING HOLD CONTROL LOGIC FOR GENERATING STALL SIGNALS TO ARBITRATE TWO READ AND ONE WRITE OPERATIONS BETWEEN PROCESSOR AND PERIPHERAL

[75] Inventors: Nicholas Ong, Tempe; Jamshid Moaddeb, Phoenix, both of Ariz.

[73] Assignee: Intel Corporation, Santa Clara, Calif.

[21] Appl. No.: 110,427

[22] Filed: Aug. 23, 1993

[51] Int. Cl.$^6$ ................................................. G06F 15/02
[52] U.S. Cl. .................... 395/821; 395/301; 395/726; 395/730; 395/732; 364/230.1; 364/240.2; 364/927.92; 364/DIG. 1
[58] Field of Search ................................. 395/275, 425, 395/325, 725, 821, 301, 726, 732, 730

[56] References Cited

U.S. PATENT DOCUMENTS

| | | | |
|---|---|---|---|
| 5,060,145 | 10/1991 | Scheuneman et al. | 364/200 |
| 5,220,651 | 6/1993 | Larson | 395/250 |
| 5,335,335 | 8/1994 | Jackson et al. | 395/425 |
| 5,353,415 | 10/1994 | Wolford et al. | 395/325 |
| 5,367,689 | 11/1994 | Mayer et al. | 395/725 |
| 5,396,602 | 3/1995 | Amini et al. | 395/325 |
| 5,414,820 | 5/1995 | McFarland et al. | 395/325 |
| 5,416,910 | 5/1995 | Moyer et al. | 395/325 |

*Primary Examiner*—Thomas C. Lee
*Assistant Examiner*—Moustafa Mohamed Meky
*Attorney, Agent, or Firm*—Blakely, Sokoloff, Taylor & Zafman

[57] ABSTRACT

A peripheral interface unit (PIU) used by a microcontroller or microprocessor core having a pipelined architecture to access peripheral modules across a peripheral bus (PBUS). Data read or write accesses to registers in the core space are decoded and passed to the PIU. Then the access is executed across a peripheral address bus portion of the PBUS and a peripheral data bus of the PBUS by the PIU. In a pipelined architecture, during any one cycle there could exist up to two read accesses and one write access to the core registers. The PIU provides the needed logic to arbitrate these three access across the PBUS. In such cases the PIU inserts proper pipeline stalls until all the accesses are completed. All read accesses from the core registers cause at least a one state pipeline stall. Write accesses only stall the pipeline if two core register writes follow each other and the PBUS is not ready at the time of the second access or if a read and write occur at the same time. The PIU prioritizes and arbitrates these accesses. During any one cycle, write operations have the highest priority, followed by read operations on a first source bus and then read operations on a second source bus. The write operation is first since the write is from the previous instruction, and the reads are from the current instruction. The order of the read instructions is chosen to ensure that the least critical read is performed last.

4 Claims, 6 Drawing Sheets

PERIPHERAL INTERFACE HAVING HOLD CONTROL LOGIC FOR GENERATING STALL SIGNALS TO ARBITRATE TWO READ AND ONE WRITE OPERATIONS BETWEEN PROCESSOR AND PERIPHERAL

BRIEF SUMMARY OF THE INVENTION

The present invention is a peripheral interface unit (PIU) used by a microcontroller or microprocessor core to access peripheral modules across a peripheral bus (PBUS). Any data read or write accesses to registers in the core space are decoded by an instruction sequencer in the core and passed to the PIU. Then the access is executed across a peripheral address bus portion of the PBUS and a peripheral data bus of the PBUS by the PIU. The PBUS also includes control signals which specify whether the access is a read or write. The PBUS may also include control signals which specify its length (byte, word, etc.).

The present invention is utilized in conjunction with a core having a pipelined architecture. Thus, during any one cycle there could exist up to two read accesses and one write access to the core registers. The PIU provides the needed logic to arbitrate these three access across the PBUS. In such cases the PIU inserts proper pipeline stalls until all the accesses are completed. All read accesses from the core registers cause at least a one state pipeline stall. Write accesses only stall the pipeline if two core register writes follow each other and the PBUS is not ready at the time of the second access or if a read and write occur at the same time.

If a read or write access to a core register from a peripheral module is decoded by the instruction sequencer in the core, the PIU uses interface signals from the core to drive the address on the PBUS and the data on the PBUS as well as the necessary PBUS control signals.

Since there can be up to two read accesses (source 1 and source 2 buses), and one write access (destination bus), the PIU has to prioritize and arbitrate these accesses. During any one cycle, write operations have the highest priority, followed by source 1 and then source 2 accesses. The write operation is first since the write is from the previous instruction, and the reads are from the current instruction. The order of the read instructions is chosen to ensure that the least critical read is performed last.

In a typical microcontroller environment, read accesses across the PBUS take at least 2 cycles, and hence require a one cycle pipeline stall. Write accesses are issued and can be handled with minimum pipeline stall hits. If the PBUS is ready, as indicated by a signal PRDY being asserted, writes to the core registers cause no pipeline stalls. A pipeline stall in case of a write occurs if two writes follow each other and the PBUS is not ready (1 wait state memory). To do this, the peripherals must buffer the data on the PBUS and the PIU has to include some special circuitry which functions to generate a not PRDY until the peripheral is ready to release the bus. Another way for the write to cause a stall is if there is also a read pending.

The addresses for the read and writes are always provided by the PIU.

DETAILED DESCRIPTION OF THE INVENTION

Figure 1:
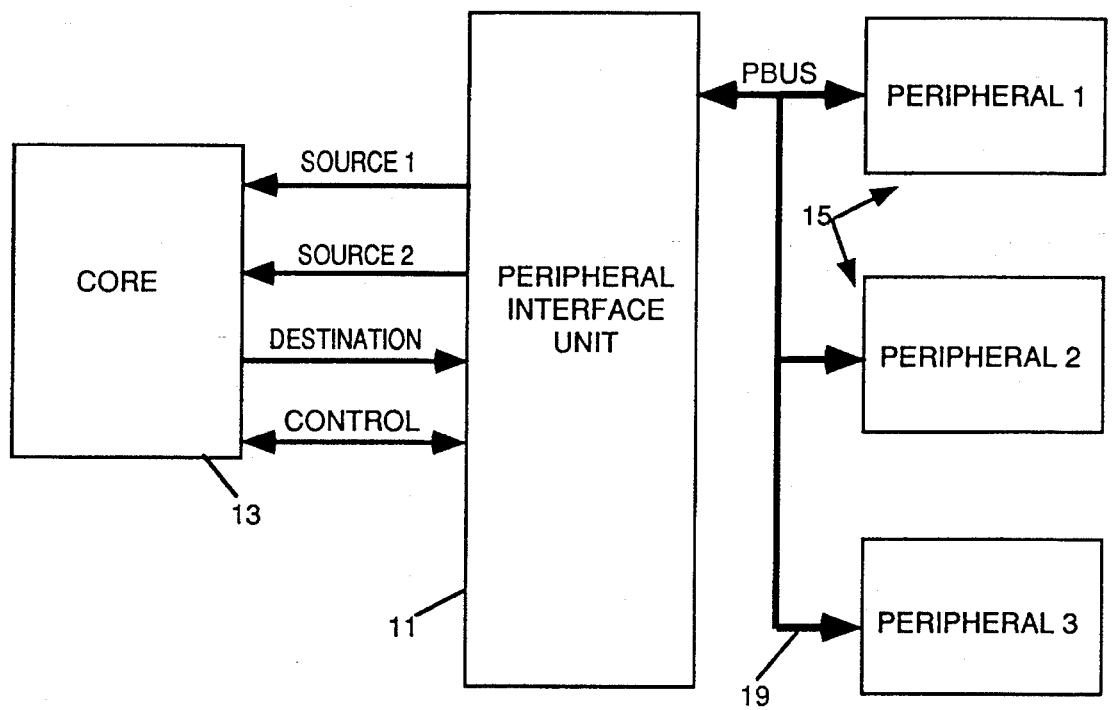
FIG. 1 is a top level block diagram showing the relationship of the invented peripheral interface unit to a core and associated peripheral units.

Referring first to FIG. 1, the present invention is a peripheral interface unit (PIU) 11 used by a microcontroller or microprocessor core 13 to access peripheral modules 15 across a peripheral bus (PBUS) 19. Any data read or write accesses to registers in the core space are decoded by an instruction sequencer in microprocessor core 13 and passed to the PIU. Then the access is executed across a peripheral address bus portion of the PBUS and a peripheral data bus portion of the PBUS by the PIU. The PBUS may also include additional control signals to specify whether the access is a byte, word or double word access. However, such additional control signals are not needed to practice the invention. Accordingly, the details of additional control signals to determine the length of a read or write are not set forth herein in order not to unduly complicate the description of the invention. However, persons skilled in the field of the invention would readily recognize that such additional signals may be employed, with the specific details being well within the abilities of a skilled digital circuit designer.

Figure 2:
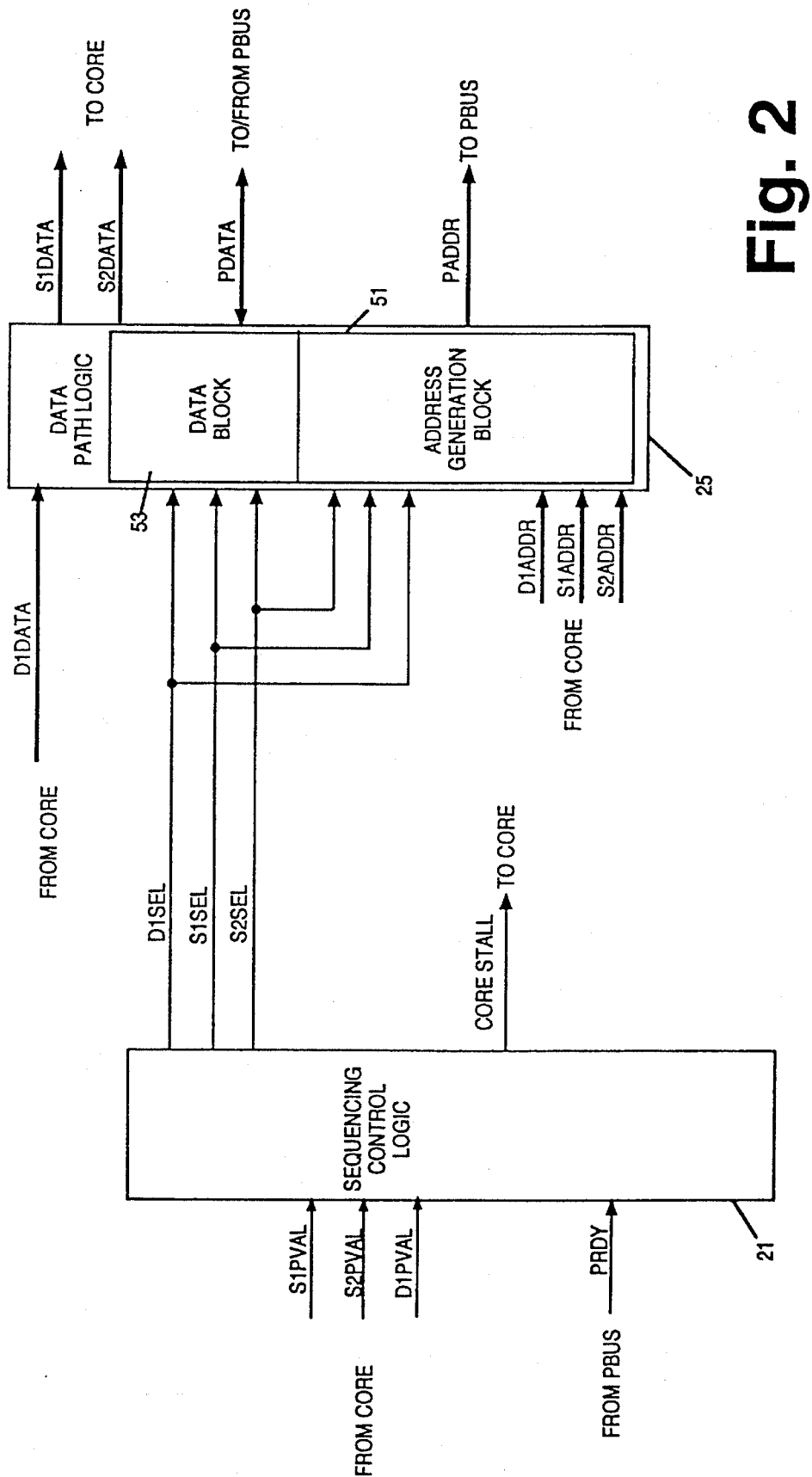
FIG. 2 is a block diagram of the invented peripheral interface unit.

As shown in FIG. 2, the PIU is divided into two parts, namely, sequencing control logic 21 and data path logic 25.

Sequencing Control Logic

Figure 3:
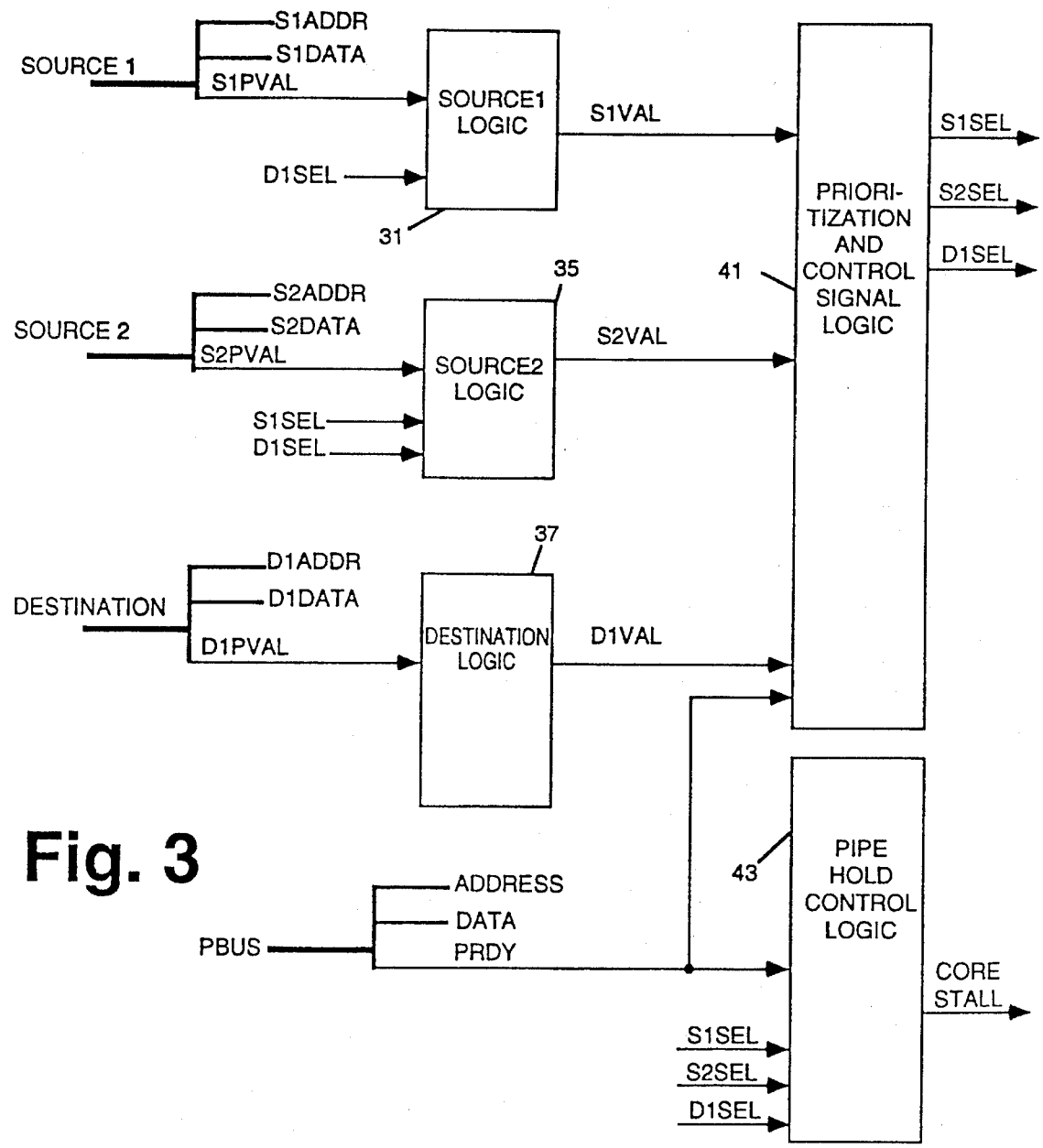
FIG. 3 is a block diagram of the sequencing control unit of the invented peripheral interface unit.

Referring now to FIG. 3, the sequencing control logic portion of the PIU is divided into five sections, source 1 logic 31, source 2 logic 35, destination logic 37, prioritization and control signal logic 41, and pipe hold control logic 43. The prioritization and control signal logic 41 generates the necessary control signals, S1SEL, S2SEL and D1SEL to the data path logic 25 to control the peripheral data bus source and destination drivers 44 (see FIG. 6) and a three to one MUX 46 for the address bus (see FIG. 5). Since only one bus can be accessed at a time, an arbitration scheme is used to generate the order of access as described below with reference to the descriptions of destination logic 37, source 1 logic 31 and source 2 logic 33.

Destination Logic 37

The destination logic 37 of the sequencing control logic 21 has priority over source1 logic 31 and source2 logic 35. The destination logic checks a destination bus control signal (D1PVAL) from the core which is asserted if the address on the D1ADDR bus is one in the core register space. If it is, the prioritization and control signal logic 41 must ensure that the PBUS is available, and then it asserts the D1SEL signal. To check the PBUS for availability, a PRDY signal, which is a control signal on the PBUS which may be asserted by a peripheral when the peripheral requires a longer access cycle, is checked. If the PRDY signal is not in the correct state to indicate that the PBUS is available, the core is stalled until the bus is available by asserting the CORE STALL signal by pipe hold control logic 43. The destination logic 37 also generates a D1VAL signal that indicates that in the current cycle there is an access to the destination logic. This signal is used by prioritization and control signal logic 41.

Destination logic 37 may be implemented as a set of logic gates, the specific details of which should be readily apparent to persons skilled in the art in view of the foregoing description.

Source 1 Logic 31

Source 1 logic 31 is the next in line for priority. If it receives a source 1 bus control signal (S1PVAL) from the core which is asserted if the address on the source 1 address bus is valid, then it checks to see if the destination logic is idle by checking the control signal D1SEL which is asserted by prioritization and control signal logic 41. If it is idle and the PBUS is available, as determined by the state of the PRDY signal as described above, then prioritization and control signal logic 41 issues the S1SEL control signal. Since all bus reads take an extra cycle, it is necessary to hold the S1SEL signal for longer than one state. To accomplish this, a feedback system of latches which are part of prioritization and control signal logic 41 are used to hold the S1SEL signal high for two states. This disables any other accesses to the data path logic 25. If the PBUS is busy, or the destination logic is busy, the S1SEL signal will wait until the two conditions for assertion are met. Source 1 logic 31 also generates the S1VAL signal for use by prioritization and control signal logic 41. This signal indicates that in the current cycle, an access to the source 1 bus is requested. This signal stays high as long as source 1 logic 31 is waiting to perform an access. It falls when the S1SEL signal falls.

Source 1 logic 31 may be implemented as a set of logic gates, the specific details of which should be readily apparent to persons skilled in the art in view of the foregoing description.

Source 2 Logic 35

Source 2 logic 35 is the last to be serviced. It acts exactly as the source 1 logic 31 except that it waits for both the destination logic 37 and source 1 logic 31 to go idle (and for the PBUS to be available) before it is allowed to assert its S2SEL signal. Source 2 logic 35 also generates the S2VAL signal for use by prioritization and control signal logic 41. This signal indicates that in the current cycle, an access to the source 2 bus is requested. This signal stays high as long as source 2 logic 35 is waiting to perform an access. It falls when the S2SEL signal falls.

Thus, the prioritization between the three blocks is provided by the setting and checking the status of the D1SEL, S1SEL and S2SEL signals.

Source 2 logic 35 may be implemented as a set of logic gates, the specific details of which should be readily apparent to persons skilled in the art in view of the foregoing description.

Prioritization and Control Signal Logic 41

Prioritization and control signal logic 41 uses the three valid signals DIVAL, S1VAL and S2VAL from the destination logic 37, source 1 logic 31 and source 2 logic 35 blocks to detect if a read or write is occurring.

Figure 4:
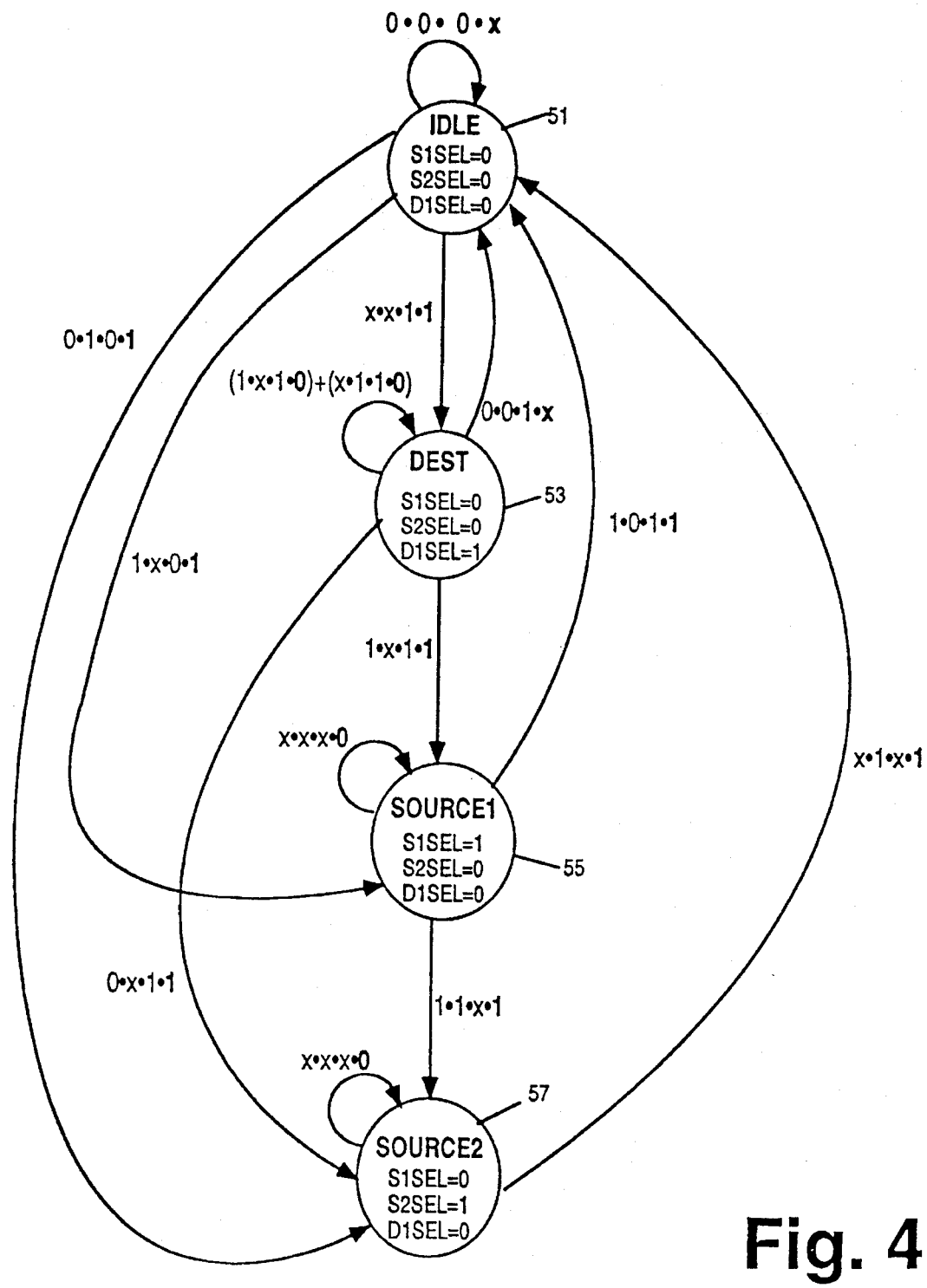
FIG. 4 is a state diagram showing how the prioritization logic is performed.

FIG. 4 shows an implementation of prioritization and control signal logic 41 as a state machine. In FIG. 4, the various paths are taken depending on the states of the signals S1VAL, S2VAL, D1VAL and PRDY, which is the order shown for the signals in each group of four characters from the set 0, 1, x. In other words, 0·0·0·x means that each of S1VAL, S2VAL, D1VAL is 0 and PRDY is x meaning don't care (1 or 0). For example, the state machine stays in IDLE state 51 so long as each of S1VAL, S2VAL and D1VAL are 0, the state of PRDY being "don't care." In the IDLE state, S1SEL, S2SEL and D1SEL are set to 0. When PRDY is asserted, control is passed to the DEST state 53, the SOURCE1 state 55 or the SOURCE2 state 57, depending on S1VAL, S2VAL and D1VAL as shown in FIG. 4, where "·" represents an AND operation and "+" represents an OR operation. Once control has been passed to one of DEST, SOURCE 1 or SOURCE 2, the state machine remains in that state so long as PRDY is 0. Once PRDY is asserted again, control passes to the next state depending on S1VAL, S2VAL and D1VAL as shown in FIG. 4. In DEST, DISEL is set to 1 and S1SEL and S2SEL are set to 0. In SOURCE1, S1SEL is set to 1 and S2SEL and D1SEL are set to 0. In SOURCE2, S2SEL is set to 1 and S1SEL and D1SEL are set to 0.

In Table I below, the results produced by the operation of the state machine shown in FIG. 4 are shown after PRDY is asserted, before control is passed back to the IDLE state.

TABLE I

| S1VAL | S2VAL | D1VAL | Result |
|---|---|---|---|
| 0 | 0 | 0 | Do nothing |
| 0 | 0 | 1 | Write Destination |
| 0 | 1 | 0 | Read Source2 |
| 0 | 1 | 1 | Write Destination, Read Source2 |
| 1 | 0 | 0 | Read Source1 |
| 1 | 0 | 1 | Write Destination, Read Source1 |
| 1 | 1 | 0 | Read Source1, Read Source2 or Read Source2, Read Source1 |
| 1 | 1 | 1 | Write Destination, Read Source1, Read Source2 or Write Destination, Read Source2, Read Source1 |

Pipe Hold Control Logic 43

Pipe hold control logic 43 checks the D1SEL, S1SEL and S2SEL select signals and ready (PRDY) signal to decide if the PIU is going to issue a pipe hold by assertion of the CORE STALL signal.

The CORE STALL signal is asserted based on the following:

1. Any read operation on source 1 produces a core stall (CORE STALL=1) of one bus cycle.

2. Any read operation on source 2 produce a core stall (CORE STALL=1) of one bus cycle.

3. If PRDY is 0, a read operation (on source 1 or source 2) produces a core stall (CORE STALL=1) of one bus cycle. This condition is maintained until PRDY is 1.

4. A write operation followed by a read operation (on source 1 or source 2) during the same bus cycle produces a core stall (CORE STALL=1) of one bus cycle.

5. A write operation when PRDY=0 produces a core stall (CORE STALL=1) of one bus cycle which is maintained until PRDY=1.

Data Path Logic 25

Figure 5:
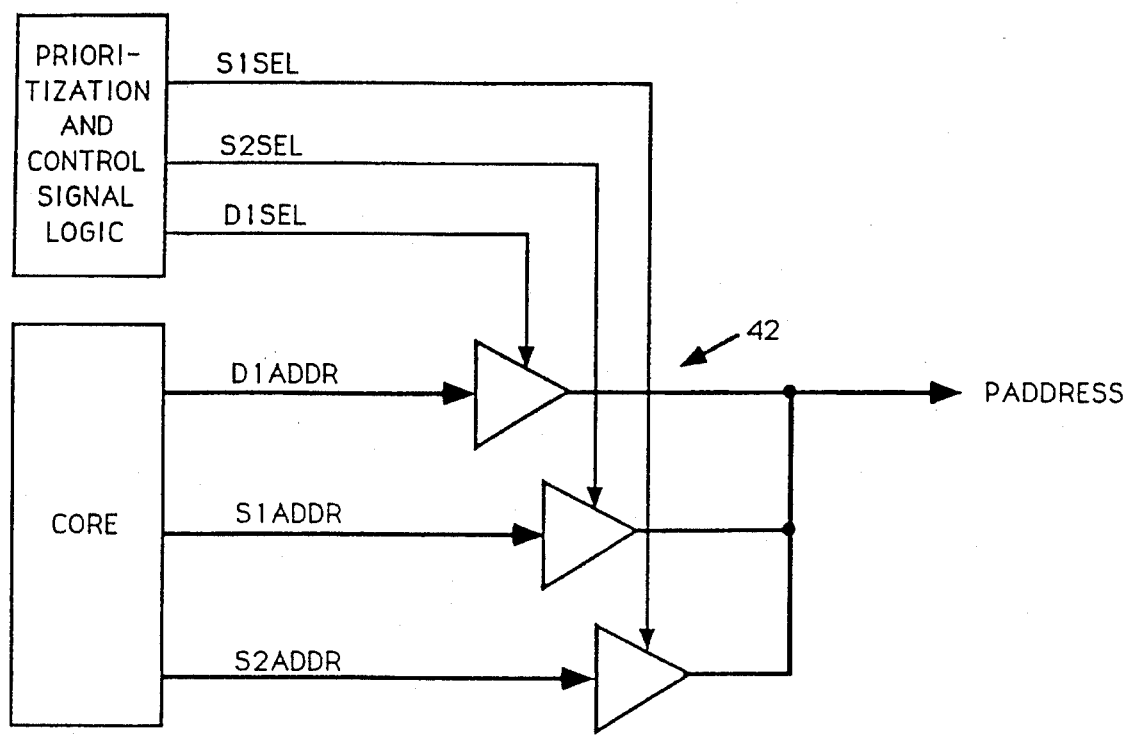
FIG. 5 is a block diagram of the address generation block of the invented peripheral interface unit.

Data path logic 25 is used to connect to the PIU to the physical PBUS. It is split into two blocks. The first block is the address generation block 51. As shown in FIG. 5, this block contains a 3 to 1 MUX 42 that determines which address is to be placed on the PBUS address lines based on the S1SEL, S2SEL and D1SEL signals.

Figure 6:
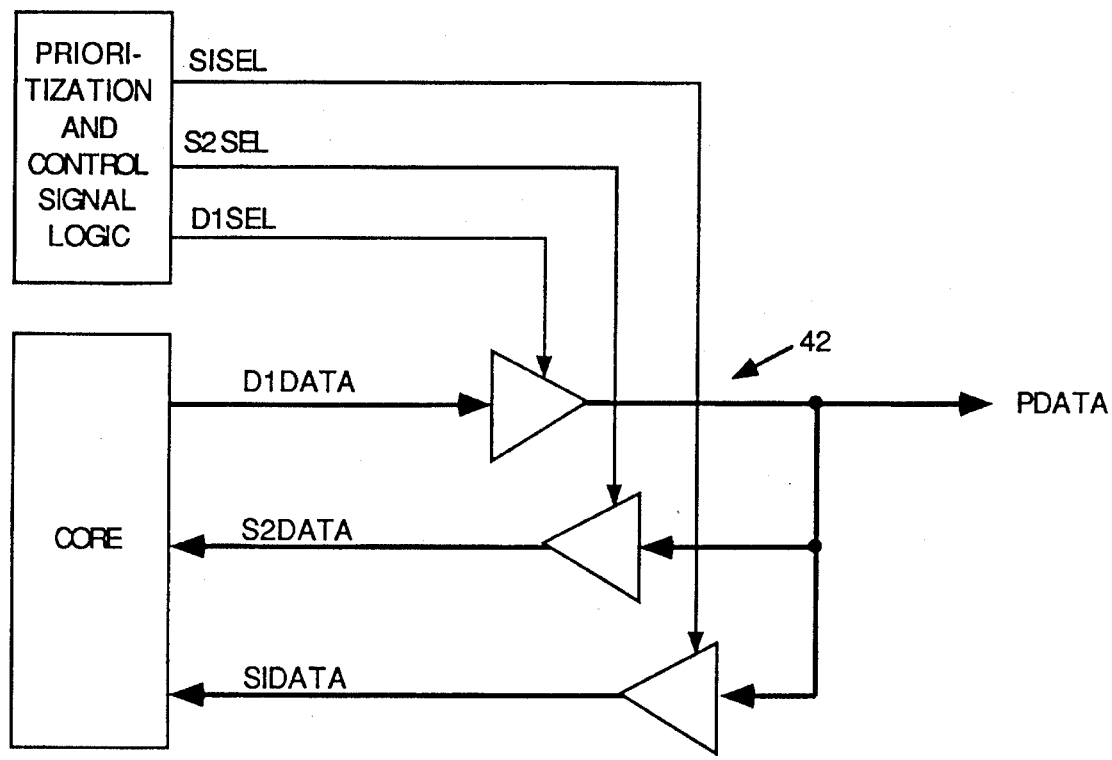
FIG. 6 is a block diagram of the data block of the invented peripheral interface unit.

The second block of the data path logic is the data block 53. As shown in FIG. 6, this block controls the peripheral data bus PDATA along with transferring data from the D1DATA bus to the PBUS or from the PBUS to the two source busses S1DATA and S2DATA.

The following is a further description of the various PBUS interface signals and the core interface signals. For data and address signals, the width of the signals is indicated as being n+1 bits wide for the address path and m+1 bits for the data path.

PBUS Interface Signals

PADDR [n:0] (Output)

Peripheral Address Bus. Driven by PIU from S1ADDR, S2ADDR, or D1ADDR address busses.

PDATA [2m:0] (Input/Output)

Peripheral Data Bus. Driven by PIU from the D1DATA data bus.

PRDY (Input)

Peripheral Ready. Peripheral Bus is ready. Asserted by a peripheral when ready. Deasserted by peripherals requiring extra wait states.

Core Interface Signals

S1ADDR [n:0] (Input)

Source 1 Address Bus. Placed on the peripheral address bus PADDR during a source 1 read.

S2ADDR [n:0] (Input)

Source 2 Address Bus. Placed on the peripheral address bus PADDR during a source 2 read.

D1ADDR [n:0] (Input)

Destination Address Bus. Placed on the peripheral address bus PADDR during a write cycle.

S1DATA [m:0] (Output)

Source 1 Data Bus. Driven by the PIU on completion of a read cycle. Contains data read from the Peripheral Data Bus.

S2DATA [m:0] (Output)

Source 2 Data Bus. Driven by the PIU on completion of a read cycle. Contains data read from the Peripheral Data Bus.

D1DATA [m:0] (Input)

Core Destination Bus. Read by the PIU upon a write cycle. Data driven to the Peripheral Data Bus.

CORE STALL (Output)

Core hold signal. Pulled low to stall the core when a core hold condition exists.

S1PVAL (Input)

Source 1 Peripheral Valid. Indicates that the current address on source 1 address bus is a valid peripheral access. This starts a read sequence of the PIU.

S2PVAL (Input)

Source 2 Peripheral Valid. Indicates that the current address on source 2 address bus is a valid peripheral access. This starts a read sequence of the PIU.

D1PVAL (Input)

Destination Peripheral Valid. Indicates that the current address on the destination bus is a valid peripheral access. This starts a write sequence of the PIU.

We claim:

1. A peripheral interface unit for interfacing a core processor having register space to at least one peripheral unit wherein the core processor utilizes a bus architecture having first and second source buses for writing data generated by the least one peripheral unit to the core and one destination bus for reading data from the core to be transferred to the at least one peripheral unit, said first and second source buses having corresponding first and second source address buses and said destination bus having a corresponding destination address bus, and the at least one peripheral unit utilizes a bus architecture having a single peripheral bus for reading data from and writing data to the peripheral unit and a corresponding peripheral address bus, said peripheral interface unit comprising:

sequencing control logic means coupled between the core processor and the peripheral bus for arbitrating accesses to and from the two source buses and the destination bus;

said sequencing control logic means comprising:

1) destination logic means coupled to said destination bus for determining the presence of a valid address into the core register space existing on the destination address bus and generating a signal D1VAL indicating that the destination logic means is being accessed;

2) first source logic means coupled to said first source bus for determining the presence of a valid address into the core register space existing on the first source address bus and the absence of a pending core write by the destination logic means and generating a signal S1VAL indicating that the first source logic means is being accessed;

3) second source logic means coupled to said second source bus for determining the presence of a valid address into the core register space existing on the second source address bus, and the absence of a pending core write by the destination logic means and the absence of a pending core read by the first source logic means and generating a signal S2VAL indicating that the second source logic means is being accessed;

4) prioritization and control signal logic means for determining the availability of the peripheral bus by checking a PRDY signal generated by said at least one peripheral unit and generating a set of signals indicating the presence and absence of a read operation on said first source bus, a read operation on said second source bus, and a write operation on said destination bus;

5) pipe hold control logic means for generating a core stall signal during each of:
   i. a read operation on said first source bus;
   ii. a read operation on said second source bus;
   iii. a read operation on one of said first source bus and said second source bus when is the peripheral bus is not ready;
   iv. a write operation followed by a read operation on one of said first source bus and said second source bus during the same bus cycle; and
   v. a write operation when the peripheral bus is not ready;

said peripheral interface unit further comprising:

b) data path logic means coupled to the sequencing control logic means for coupling the first and second source buses and the destination bus to the peripheral bus.

2. The peripheral interface unit defined by claim 1 wherein said data path logic means comprises:

a) an address generation means for determining an address to place on said peripheral bus; and
b) a data path means for selectively transferring data from the destination bus to the peripheral bus and from the periperal bus to one of said first and second source buses.

3. The peripheral interface unit defined by claim 2 wherein said address generation means comprises a three to one multiplexor.

4. The peripheral interface unit defined by claim 1 wherein said prioritization and control signal logic means comprises a state machine having a first state designated IDLE, a second state designated DEST, a third state designated SOURCE 1 and a fourth state designated SOURCE 2, wherein the state machine stays in the IDLE state while S1VAL, S2VAL and DIVAL signals are 0, and when PRDY signal is asserted, control is passed to a predetermined one of the DEST state, the SOURCE 1 state and the SOURCE 2 states after which, the state machine remains in that state while PRDY signal is 0, and when PRDY signal is asserted, control passes to a predetermined next state depending on S1VAL, S2VAL and D1VAL signals.

* * * * *

UNITED STATES PATENT AND TRADEMARK OFFICE
CERTIFICATE OF CORRECTION

PATENT NO.    :    5,513,372
DATED         :    April 30, 1996
INVENTOR(S)   :    Ong et al.

It is certified that error appears in the above-identified patent and that said Letters Patent is hereby corrected as shown below:

In column 3 at line 62 delete "DIVAL" and insert --D1VAL--

Signed and Sealed this

Sixth Day of August, 1996

Attest:

BRUCE LEHMAN

*Attesting Officer*    Commissioner of Patents and Trademarks